United States Patent [19]
Huffman

[11] Patent Number: 5,841,895
[45] Date of Patent: Nov. 24, 1998

[54] METHOD FOR LEARNING LOCAL SYNTACTIC RELATIONSHIPS FOR USE IN EXAMPLE-BASED INFORMATION-EXTRACTION-PATTERN LEARNING

[75] Inventor: Scott B. Huffman, Menlo Park, Calif.

[73] Assignee: PriceWaterhouseCoopers, LLP, New York, N.Y.

[21] Appl. No.: 736,890

[22] Filed: Oct. 25, 1996

[51] Int. Cl.⁶ .............................. G06K 9/62; G06F 15/18
[52] U.S. Cl. ................................ 382/155; 706/16; 706/25
[58] Field of Search ................................ 395/21, 23, 50, 395/54, 75, 77; 706/15, 16, 19, 20, 25, 50, 59, 61; 382/155, 156, 181, 224, 229

[56] References Cited

U.S. PATENT DOCUMENTS

| | | | |
|---|---|---|---|
| 5,034,898 | 7/1991 | Lu | 364/513 |
| 5,212,821 | 5/1993 | Gorin | 395/22 |
| 5,222,197 | 6/1993 | Teng | 395/77 |
| 5,317,647 | 5/1994 | Pagallo | 382/161 |
| 5,355,510 | 10/1994 | Sekine | 395/800 |
| 5,424,947 | 6/1995 | Nagao et al. | 364/419.08 |
| 5,481,650 | 1/1996 | Cohen | 395/77 |
| 5,487,135 | 1/1996 | Freeman | 395/75 |
| 5,504,840 | 4/1996 | Hiji | 395/77 |
| 5,721,938 | 2/1998 | Stuckey | 395/754 |

OTHER PUBLICATIONS

E. Brill, "Some advances in transformation–based part of speech tagging," In *Proceedings of the Twelfth National Conference on Artificial Intelligence* (AAAI–94), pp 722–727 (1994).

Chinchor et al., "MUC–5 evaluation metrics," In *Proceedings of the Fifth Message Understanding Conference MUC–5* Morgan Kaufmann, San Mateo, CA (1993).

R. J. Hall, "Learning by failing to explain," *Machine Learning*, 3(1) pp 45–77 (1988).

Hobbs, et al., "FASTUS: A system for extracting information from natural–language text," *Technical Report No. 519*, SRI International, (1992).

J.R. Hobbs, "The generic information extraction system," In *Proceedings of the Fifth Message Understanding Conference (MUC–5)* Morgan Kaufmann, San Mateo, CA (1993).

Lehnert et al., "UMass/Hughes: Description of the CIRCUS system used for MUC–5," In *Proceedings of the Fifth Message Understanding Conference MUC–5* Morgan Kaufman, San Mateo, CA (1993).

George Miller, "Five papers on WordNet," *International Journal of Lexicography* 3 pp. 235–312 (1990).

Mitchell et al., "Explanation–based generalization: A Unifying View," *Machine Learning* 1 (1986).

(List continued on next page.)

*Primary Examiner*—Leo H. Boudreau
*Assistant Examiner*—Bhavesh Mehta
*Attorney, Agent, or Firm*—Townsend and Townsend and Crew LLP; Kenneth R. Allen

[57] ABSTRACT

A method is provided for learning local syntactic relationships for use in an example-based information-extraction-pattern learning element of an automated information extraction system. The example-based learning element learns information extraction patterns from user-provided examples of texts paired with events the texts contain; these patterns can then be used by the information extraction system to recognize similar events in subsequent texts. The learning element learns patterns by analyzing each example text/event pair to determine paths of local syntactic relationships between constituents in the text that indicate the event. The learning element employs an incomplete dictionary of local syntactic relationships for this analysis. The present invention learns new local syntactic relationships for text/event pairs that cannot be analyzed using the learning element's initial, incomplete dictionary of relationships. These new relationships are added to the dictionary, and allow the learning element to learn patterns from example text/event pairs that cannot be analyzed using only the initial dictionary.

4 Claims, 9 Drawing Sheets

OTHER PUBLICATIONS

M. Pazzani, "Learning to predict and explain: An integration of similarity–based, theory driven, and explanation–based learning," *Journal of the Learning Sciences* 1(2) pp. 153–199 (1991).

E. Riloff, "Automatically constructing a dictionary for information extraction tasks," In *Proceedings of the Eleventh National Conference on Artificial Intelligence* AAAI–93) pp. 811–816 (1993).

Soderland et al., "Wrap–Up: A trainable discourse module for information extraction," *Journal of Artificial Intelligence Research* (JAIR) 2 pp. 131–158 (1994).

K. VanLehn, "Learning one subprocedure per lesson," *Artificial Intelligence* 31(1) pp. 1–40 (1987).

Jun–Tae Kim and Dan I. Moldovan, "Acquisition of Linguistic Patterns for Knowledge–Based Information Extraction," IEEE Transactions on Knowledge and Data Engineering, Oct. 1995, vol. 7, No. 5, pp. 713 to pp. 724.

Ellen Riloff, "Automatically Constructing a Dictionary for Information Extraction Tasks," Trainable Natural Language Systems, no date (most recent reference 1994), pp. 811 to 816.

Scott B. Huffman, "Learning Information Extraction Patterns From Examples," no date (most recent reference 1995), 15 pages.

METHOD FOR LEARNING LOCAL SYNTACTIC RELATIONSHIPS FOR USE IN EXAMPLE-BASED INFORMATION-EXTRACTION-PATTERN LEARNING

BACKGROUND OF THE INVENTION

This invention relates to the extraction of information from text and more particularly to techniques for automated information extraction which employ pattern recognition using patterns which are learned automatically from example texts.

Information extraction can be defined as the detection and extraction of particular events of interest from is text. Examples include FASTUS from SRI International in Menlo Park, Calif., and CIRCUS from the University of Massachusetts of Amherst, Mass.

Although significant progress has been made on information extraction systems in recent years, coding the knowledge that these systems need in order to extract new kinds of information and events is an arduous and time-consuming process. The dictionaries of syntactic and semantic patterns used to recognize each type of event are typically manually built by a team of highly-trained specialists. As the amount of on-line text (newswires, World Wide Web documents, etc.) and the number of users with access continues to grow, however, there is a need to extract an ever-widening diversity of types of information and events. Requiring that specialists hand build the extraction knowledge for this diversity of extraction tasks is untenable.

Attention is directed to Riloff's AutoSlog system (E. Riloff, "Automatically constructing a dictionary for information extraction tasks", *Proceedings of the Eleventh National Conference on Artificial Intelligence*, AAAI-93 pp. 811–816, 1993). AutoSlog is a knowledge acquisition tool that uses a training corpus to generate proposed extraction patterns for the CIRCUS extraction system. A user either verifies or rejects each proposed pattern. AutoSlog does not try to recognize relationships between multiple constituents. Rather, it builds smaller patterns that recognize instances of single role-fillers. Later stages of CIRCUS then combine these instances into larger events.

Attention is also directed to J. Kim and D. Moldovan's PALKA system described in "Acquisition of linguistic patterns for knowledge-based information extraction", *IEEE Transactions on Knowledge and Data Engineering*, 7(5):713–24, 1995. PALKA is a machine learning system that learns extraction patterns from example texts. The patterns are built using a fixed set of linguistic rules and relationships. It does not suggest how to learn syntactic relationships that can be used within extraction patterns learned from example texts.

An earlier technique for learning extraction patterns is described in U.S. pat. app. Ser. No. 08/469,981 filed Jun. 6, 1995 in the name of the present inventor, which is incorporated herein by reference and made a part hereof. The earlier work is also described in part in the writing of the present inventor in "Learning Information Extraction Patterns from Examples", in *Connectionist, Statistical, and Symbolic Approaches to Learning for Natural Language Processing*, ed. S. Wermter, E. Riloff, and G. Scheler, Springer, 1996, pp. 246–60. An early version of the earlier work was published in August 1995 at the International Joint Conference on Artificial Intelligence workshop on New Approaches to Learning for Natural Language Processing. The earlier work did not address the issue of learning building blocks (i.e., local relationships) for patterns, which is addressed herein.

SUMMARY OF THE INVENTION

According to the present invention, a method is provided for learning local syntactic relationships for use in an example-based information-extraction-pattern learning system, which in turn is used in connection with an automated information extraction system. The example-based learning system initially learns information extraction patterns directly from user-provided examples of texts paired with events the texts contain. The patterns which are learned are then used by the automated information extraction system to recognize similar events within sentences in subsequent texts. The patterns recognize events by verifying a series of local syntactic relationships between key constituent within a sentence. The example-based learning system learns patterns by analyzing each example sentence/ event pair to determine a series of local syntactic relationships within the sentence that relate the constituents containing the information describing the event. The example-based learning system initially contains an incomplete dictionary of local syntactic relationships that is used for this analysis process. According to the present invention, new local syntactic relationships are learned by inferring finite state machines that extend the example-based learning system's dictionary of relationships. The new relationships allow the example-based learning system to learn patterns from example sentence/event pairs that cannot be analyzed using only the example-based learning system's initial dictionary of relationships.

The technique used by the present invention to learn local extraction relationships may be viewed as a method for extending the domain theory of an explanation-based learning system (that is, the example-based pattern learning system) using simple inductive learning.

In a specific embodiment, the extraction task is to identify corporate management changes, and an example of such a system is disclosed. For this extraction task, sets of patterns learned by the example-based learning system using the present invention perform nearly at the level of a hand-built dictionary of information extraction patterns.

The invention will be better understood upon reference to the following detailed description and the accompanying drawings.

DESCRIPTION OF SPECIFIC EMBODIMENTS

This invention focuses on a computer-based method and system for learning to extract information within individual sentences, rather than on full-scale extraction which typically includes a sentence-level extraction phase followed by a "merging" phase in which information drawn from different sentences is combined. The context of the invention is a natural language processing (NLP) type information retrieval system. The present specification borrows from the earlier patent application in respect to FIGS. 1–6, which describes the general pattern learning system and process for extraction.

Figure 1:
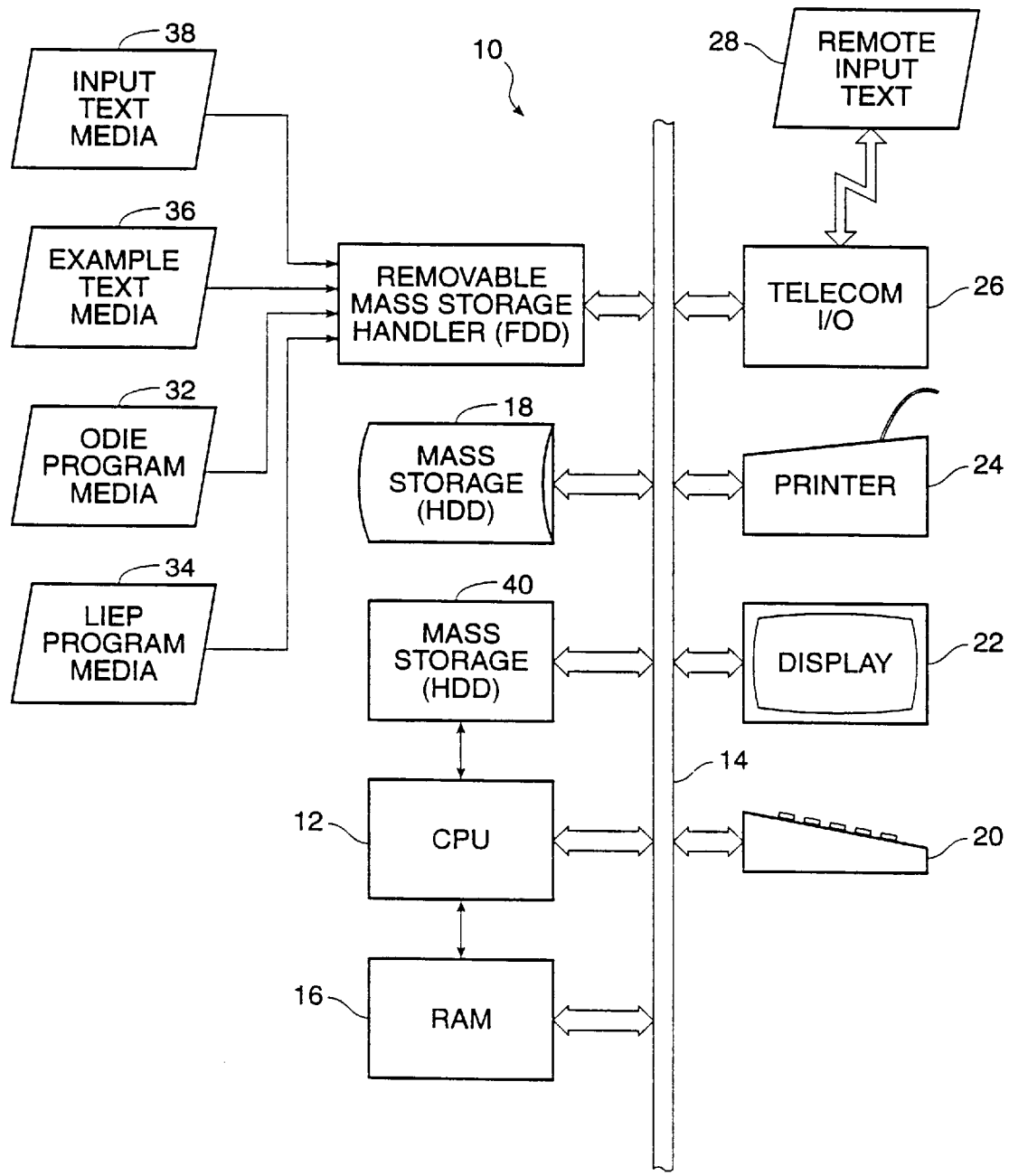
FIG. 1 is a hardware block diagram of a system according to the invention.

Referring to FIG. 1, an information retrieval system 10 according to the invention may comprise a CPU 12 which data address and control functions interconnected with other subsystems either directly or through a bus system 14, including coupling to a random access memory means 16 for storage of executable programs and active data. Also connected to the bus is one or more mass storage means (fixed disk drives) 18, 40, a manual input means 20 such as a keyboard and pointer, an output display means 22, an output printer 24, a network or telecommunications input (and output) device 26 for use for example in accessing input text 28 from remote data sources, and a removable mass storage handling means (diskette drive) 30 for receiving media containing an on-line information extraction (ODIE) computer program system 32, a "learning information extraction patterns" (LIEP) computer program system 34, example text 36 and additional input text 38. The contents of the various media forming the applications defining the systems according to the invention are loaded through a removable mass storage handler 42 (such as a diskette drive) and may be stored substantially permanently in the mass storage system 18, along with any operating systems needed to facilitate operation of the hardware components. Example text 36 (on removable media) is used primarily for training the LIEP system 34 "off-line", i.e., prior to processing of unknown text, or in some cases interactively, if the user is an "oracle" whose job it is to define patterns. The LIEP system 34 is used to build or augment a pattern or example dictionary 40 stored in the mass storage means 40 useful for the ODIE system in performing NLP-based information extraction, as hereinafter explained. The ODIE system 32 performs information extraction on any input text, whether provided from a local medium (38) or remote sources (28).

The purpose of the ODIE system is to recognize and "extract" or log from input text an item of information herein called an event. Extracting an event from text typically involves recognizing a group of entities (words or phrases representative of objects or concepts) of specific types that have particular relationships between them. Entities are generally expressed as noun phrases. To recognize an event in a sentence, a system must identify the entities of interest and determine that the syntactic and semantic relationships within the sentence indicate the event and the entities' roles in it.

An exemplary domain of application of a system according to the invention is the extraction of information about business management changes in the domain of management change events. This domain has been selected as being illustrative but not limiting as to the applicability of the invention to identify information events.

In the domain of management change events, the entities of interest are companies, people, and management titles (e.g., "vp of finance", "CEO", etc.). A variety of syntactic and semantic relationships between these entities in a sentence can indicate a management change event.

NLP-based extraction techniques, as opposed to simple keyword, proximity, or topic/entity searches, are needed for reasonably accurate extraction for this task. Not every combination of person/company/title in close proximity indicates a management change, even when other keyword indicators (e.g., named, announced, appointed, etc.) are nearby. For example, consider the following sample news release:

"NORTH STONINGTON, Connecticut (Business Wire) —Dec. 2, 1994—Joseph M. Marino and Richard P. Mitchell have been named senior vice presidents of Analysis & Technology Inc. (NASDAQ NMS: AATI), Gary P. Bennett, president and CEO, has announced."

In this example, Joseph M. Marino and Richard P. Mitchell participate in management changes, but Gary P. Bennett does not, despite the mention of both a company and a title near his name. The present system learns patterns that are useful for correctly handling and extracting relevant events from such texts, more accurately and completely than keyword, proximity, or topic/entity search retrieval techniques.

Figure 2:
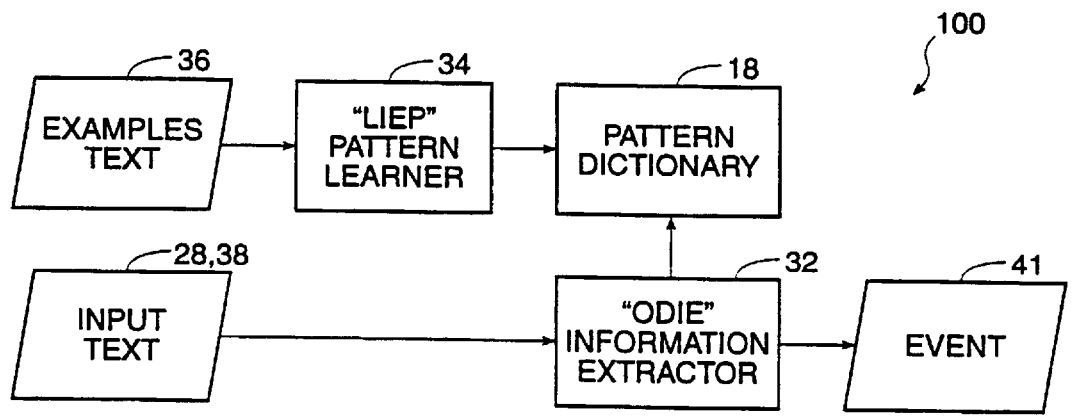
FIG. 2 is a functional block diagram of a system according to the invention.
Figure 4:
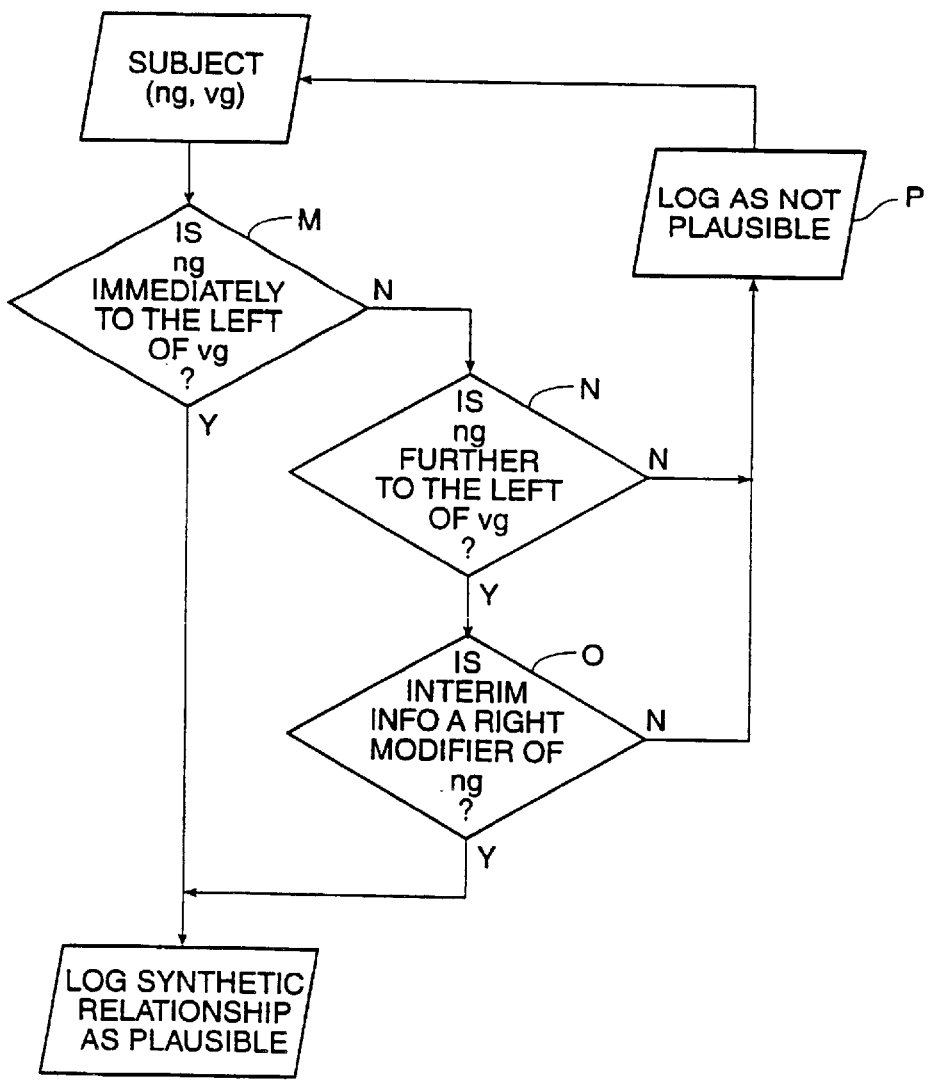
FIG. 4 is a flow chart illustrating one aspect of a pattern learning process according to the invention.

Referring to FIG. 2, the extraction system extracts events from texts it is given on demand. Referred to as the ODIE system 32 (for "On-Demand Information Extractor"), it processes input text 28, 38 using a set of patterns from a pattern dictionary 40 (i.e., in mass storage 40) specially prepared by a pattern learning system 34 using examples 36 to identify a class of events 41 to be extracted or logged from the input text 28, 38.

Figure 3:
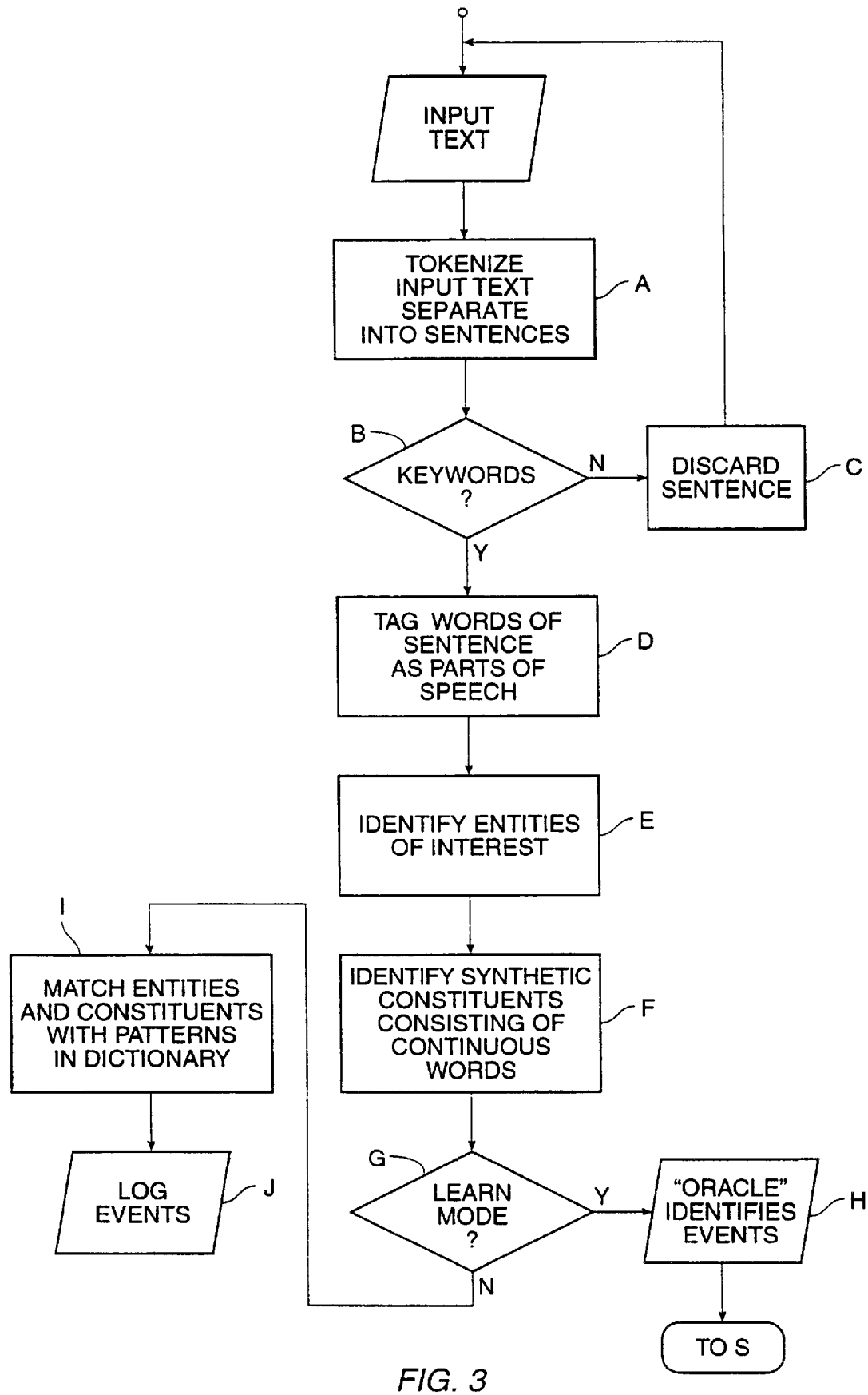
FIG. 3 is a flow chart illustrating operation of the information extraction process according to the invention.

Referring to FIG. 3, given an input text, the ODIE system 32 first tokenizes the text and breaks it into sentences (Step A). For each sentence, ODIE checks whether the sentence contains any of a set of keywords that indicate the possibility that the sentence expresses an event of interest (Step B). If no keywords are found, the sentence is thrown away (Step C); otherwise, the words in the sentence are tagged with their parts of speech (Step D). (A part-of-speech detector designed and described by Eric Brill is useful for this purpose. Others may also be used.)

Figure 5:
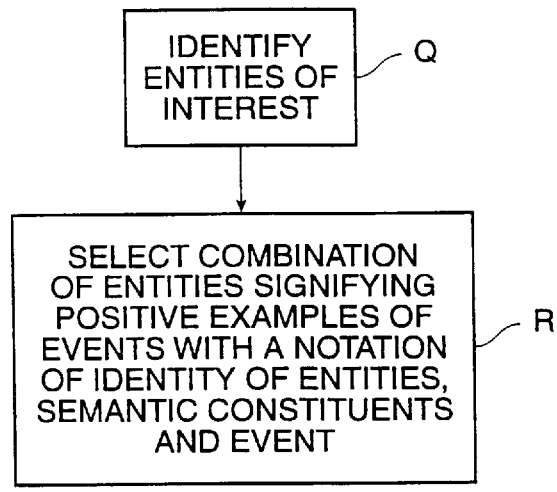
FIG. 5 is a flow chart illustrating another aspect of a pattern learning process according to the invention.

Next, entities of interest are identified (Step E) and then syntactic constituents consisting of contiguous words are identified (Step F) (and at least temporarily stored). For management changes, the entities of interest are "people", "company names", and "management titles". Syntactic constituents include noun groups, verb groups, and prepositions. The grammars used for identifying noun and verb groups are loosely based on those used by FASTUS, referenced above. If the system is in the learning mode, i.e., the input text is the example text used for training the system, (Step G), an "oracle" or superuser identifies the entities of interest that constitute valid events (Step H), as explained below (FIG. 5).

Figure 7:
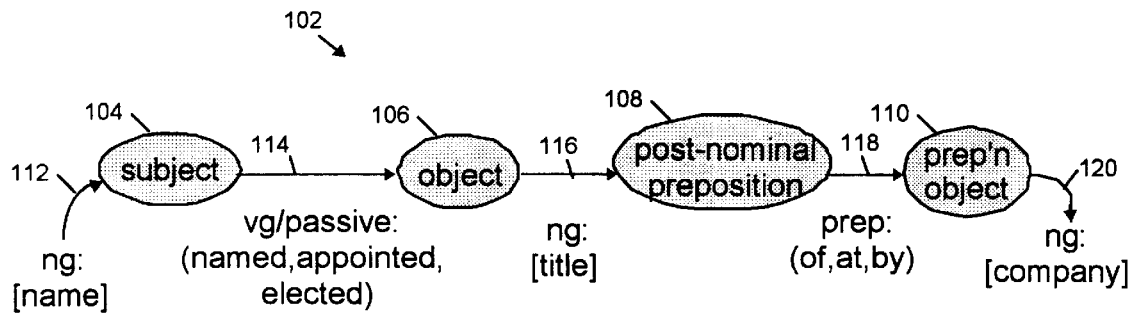
FIG. 7 is a diagram of a finite state machine which is an example of a pattern used by the information extraction system according to the invention.

Finally (Step I) the ODIE system matches the entities and constituents with patterns in a pattern dictionary of previously-stored patterns to identify valid events. These patterns match against sentence constituents moving left-to-right through the sentence to identify events. A typical pattern 102 is diagrammed in FIG. 7, which is a finite state machine (FSM) diagram consisting of states 104, 106, 108, 110 and transitions 112, 114, 116, 118, 120. In FIG. 7, a high-level overview of pattern 102 is shown, of which each of the states represents an embedded finite state machine.

Patterns are stored and implemented as paths through a finite-state machine. Patterns match sentence constituents by testing head words/entities (112, 114, 116, 118, 120) and other simple properties (e.g. active/passive for verb groups (114) of constituents, and by attempting to verify local syntactic relationships (104, 106, 108, 110) between those constituents. If all of the local syntactic relationships are verified, such as described in connection with FIG. 4, an information event (e.g., a corporate or business entity management change event) is logged (Step J of FIG. 3).

Figure 8A:
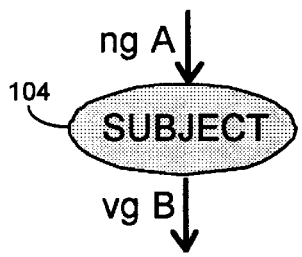
FIG. 8A and 8B are two representations of a finite state machine illustrating an element of FIG. 7, namely, a local syntactic relationship used by the information extraction system according to the invention.
Figure 8B:
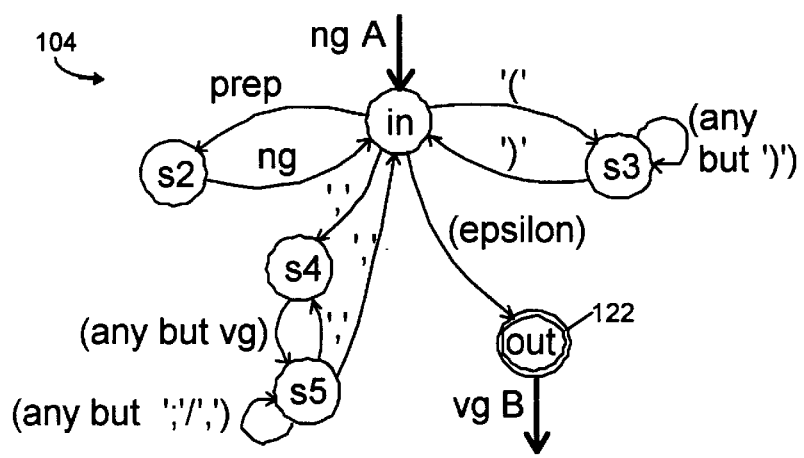

Rather than construct a complete and consistent parse of the entire sentence, the ODIE system according to the invention (FIG. 4) attempts merely to verify the plausibility of the specific local syntactic relationships between pairs of constituents that are tested in extraction patterns. The relationships are verified by examining purely local information—namely, the constituents between those being related. For instance, subject(ng,vg) is considered valid if either there are no constituents between ng and vg, or if the constituents between ng and vg could be possible right-modifiers of ng, such as prepositional phrases, parentheticals, comma-delimited strings like relative clauses, etc. These conditions are represented as a FSM 104, shown in FIG. 8A and FIG. 8B. To test whether subject(ng, vg) holds, ODIE passes the constituents in the sentence from ng to vg through this FSM 104, as illustrated in detail in FIG. 8B. If the machine 104 finishes in the accept state 122, the relationship holds. Similar FSMs encode other local syntactic relationships such as "object" 106, "post-nominal-preposition" 108, "preposition-object" 110, etc., also allowing those relationships to be tested within information extraction patterns.

Figure 9:
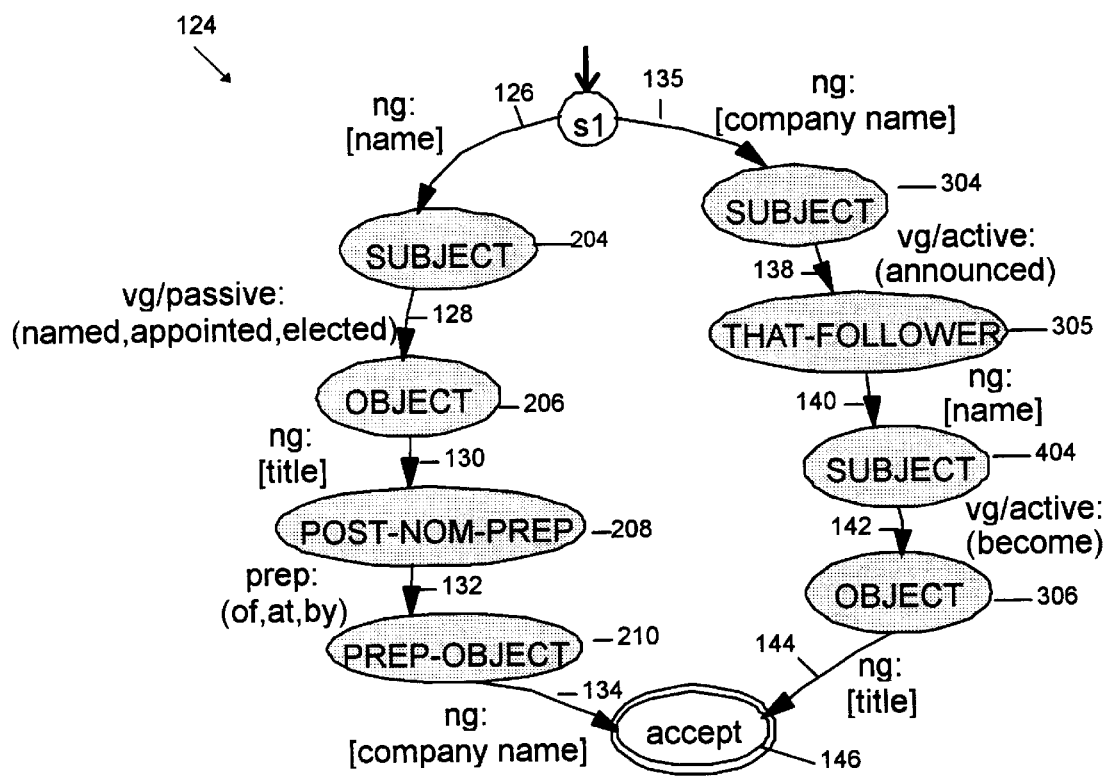
FIG. 9 is a finite state machine diagram illustrating an example of a set of patterns used by the information extraction system for extraction according to the invention.

The extraction patterns themselves are encoded in a larger non-deterministic finite-state machine 124 that embeds local syntactic relationship FSMs. An example of an extraction FSM containing a few extraction patterns is shown in FIG. 9. Each pattern is a path through the FSM 124, with tests for constituents on the path's transitions (126, 128, 130, 132, 134, 136, 138, 140, 142, 144), and tests for syntactic relationships between constituents as calls to embedded syntactic relationship FSM's (204, 206, 208, 210, 304, 305, 404, 306). SRI's FASTUS, cited above, also uses FSM's with syntactic content to implement extraction patterns.

Implementing extraction patterns in a non-deterministic FSM allows them to be matched quickly, in parallel, against each input sentence. The sentence's constituents are input left-to-right into the machine, and an event is logged whenever the accept state 146 is reached. Local syntactic relationships are verified "on demand" when transitions into their embedded FSM's are followed. This can be contrasted with the "full parsing" of standard NLP systems. The advantage of on-demand parsing is avoiding the difficult, time-consuming, and semantic knowledge-intensive process of full parsing. The disadvantage is that on-demand parsing's local, non-semantic nature can verify relationships that are not valid in the correct full parse of the sentence. For example, multiple noun groups can plausibly possess the local syntactic relationship "subject" with a given verb group in a sentence. In a full parsing system, complex semantic constraints would be applied to determine a single "subject" noun group for each verb group. In on-demand parsing, such complex semantic constraints are not used; instead, constraint is provided by the fact that the system only considers series of syntactic relationships appearing within specific extraction patterns in the extraction pattern FSM.

When applying a given extraction pattern to a sentence, the method of the present invention using the ODIE system never generates all possible "subject" noun groups for a verb group. Rather, it only checks whether any noun group with the particular type of head tested in the given extraction pattern can plausibly fit that relationship. That relationship is only "accepted" (affects the system's output) if the rest of the relationships in the pattern are also plausible. This provides enough constraint to avoid most incorrect interpretations (spurious loggings of events).

An object is to produce fully user-trainable extraction systems that allow a novice user to build a new dictionary of extraction patterns simply by indicating a few examples of a new event of interest. Thus, according to an important aspect of the invention, information extraction patterns are learned by a learning extraction (LIEP) system from example texts containing events of relevance. The LIEP system allows a user acting as an "oracle" to interactively identify events in texts.

Referring to FIG. 5, for each potential training sentence, entities of interest (e.g. people, companies, and titles) are identified (Step Q), and the user can thereafter choose which combinations of the entities signify events to be extracted (Step R). An event (e.g., a management change) includes a set of roles (e.g., person, title, company) with specific entities filling each role. Each positive example thus consists of a sentence processed to identify entities and syntactic constituents, and an event that occurs in the sentence.

Figure 6:
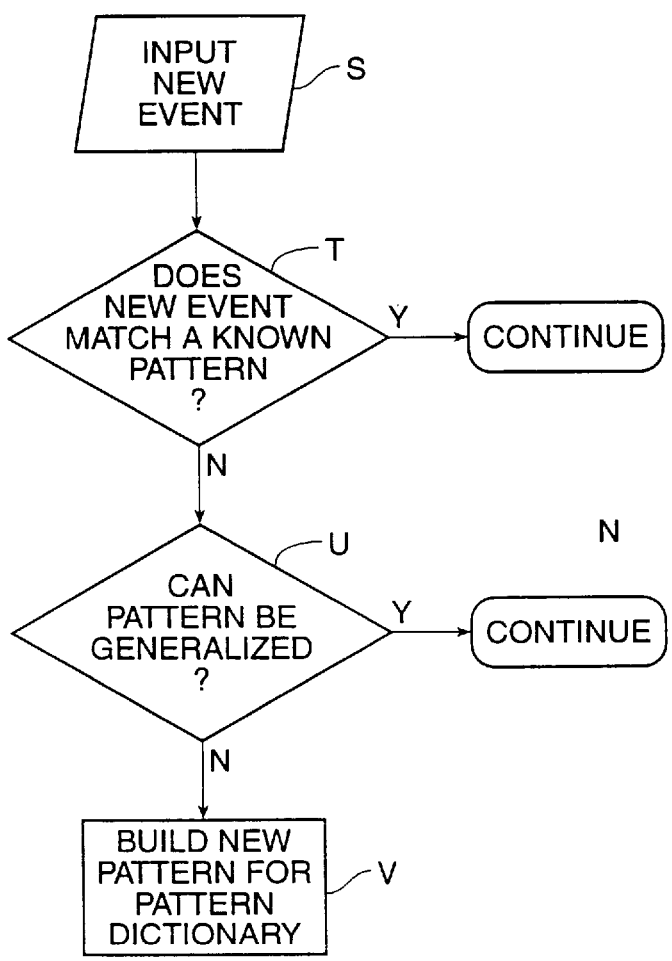
FIG. 6 is a flow chart illustrating another aspect of a pattern learning process according to the invention.

The LIEP system attempts to build a set of extraction patterns that will maximize the number of extractions of positive examples and minimize spurious extractions. Referring to FIG. 6, given a new example of an event (Step S) that is not already matched by a known pattern (Step T), the LIEP system first attempts to generalize a known pattern to cover the example (Step U). If generalization is not possible or fails to produce a high-quality pattern, the LIEP system builds a new pattern based on the example (Step V). Consider first how new patterns are built, and then how they are generalized.

The LIEP system creates potential patterns from an example sentence/event by searching for sets of relationships that relate all of the role-filling constituents in the event to one another. Since the example extraction task herein has three constituents, the LIEP system attempts to find paths of relationships between each pair of constituents (three pairs) and then merges those paths to create sets of relationships relating all three.

The relationship between a pair of constituents can either be direct—as between ng and vg if subject(ng,vg) holds—or indirect, where the constituents are the endpoints of a path of relationships that passes through other intermediate constituents. Such intermediate constituents are included as part of a pattern construct only when needed to relate role-filling constituents. For instance, in "Bob was named CEO of Foo Inc." (Example 1), Bob and CEO are related by:

subject(Bob,named),object(named,CEO))

To find relationships between pairs of constituents, the LIEP system uses the recursive, depth-first algorithm shown below:

```
find_relationships(C1,C2)
    {if direct_relationship(C1,C2,R) then return(R)
     else
        while (choose_next_intermediate_constituent(CIntermediate))
            {Rels1 = find_relationships(C1,CIntermediate)
             Rels2 = find_relationships(C2,CIntermediate)
             return(Rels1 + Rels2)}
        else failure.}
```

The LIEP system operating according to this algorithm first tries to find a direct relationship between the constituents. If there is none, it chooses another constituent in the sentence and tries to find paths of relationships between each of the original constituents and this intermediate constituent. The expression "Choose_next_ . . . " selects intermediate constituents to use starting from the rightmost constituent between the two being related, and moving left to the beginning of the sentence.

In some cases, no path of relationships between a pair of constituents can be found. When this occurs, it indicates that the ODIE system's set of local syntactic relationships (which is simple and incomplete) is insufficient to cover the example. A common example of this occurs because the ODIE system's initial set of local syntactic relationships does not account for parallel structure, as in "Foo Inc. named Bob Smith CEO, and Jane Jones president" (Example 1b).

ODIE's initial set of relationships cannot be used to relate "Foo Inc." to "Jane Jones" because none of the relationships can relate a verb group (like "named") to a noun group constituent (like "Jane Jones") that is separated from it by other noun groups (like "Bob Smith" and "CEO") and a conjunction ("and"). Thus, using only ODIE's initial set of relationships, the LIEP system would not be able to create a pattern from the example:

"company(Foo Inc.), person(Jane), title(president)".

This is not a weakness in the LIEP system's basic learning algorithm, but a characteristic of the syntactic vocabulary used to analyze the examples (that is, the initial set of local syntactic relationships). In machine learning terms, this is known as "representation bias".

Thus, according to a key claim of the current invention, when no path of relationships can be found between a pair of constituents during the LIEP system's processing of an input training example, a new local syntactic relationship is induced from the example that allows the pair of constituents to be related. The newly learned local relationship allows the smallest unrelatable gap between the pair of constituents to be related, as described below. The new relationship is represented in the form of an embeddable FSM, just as ODIE's initial set of relationships are represented (such as the "subject" relationship FSM shown in FIG. 8A and 8B), and is stored in ODIE's dictionary of local syntactic relationships.

Details of the method used by the present invention to induce new local syntactic relationships based on training examples like (1b) will be described further below, following completion of describing the LIEP system's overall processing of a training example.

After relationship paths are found between the successive pairs of role-filling constituents in an input example (using ODIE's initial set of relationships, and possibly also by inducing new local syntactic relationships), they are combined into an overall path. For instance, for example (1) above, after relationship paths are found between the successive pairs of role-fillers "Bob" and "CEO", "CEO" and "Foo Inc.", they are combined into the overall path:

[subject(Bob,named),
object(named,CEO),
post_nominal_prep(CEO, of),
prep_object(of, Foo Inc.)]

Figure 10:
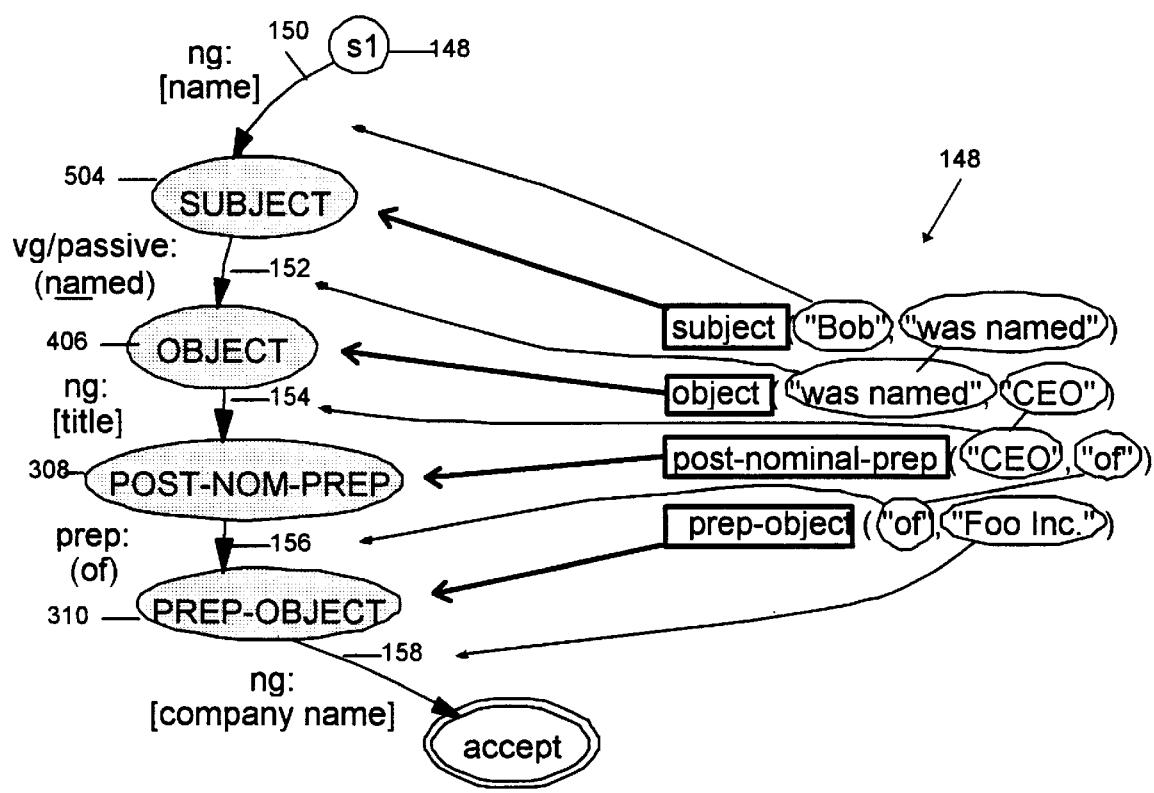
FIG. 10 is a diagram illustrating a process used by the learning system for constructing a finite state machine path based on an input example according to the invention.

As shown in FIG. 10, this path 147 is then transformed into a series of FSM states (148, 504, 406, 308, 310, 160) and transitions (150, 152, 154, 156, 158). Each syntactic relationship's corresponding FSM is embedded in the path. For instance, "subject(Bob,named)" causes the "subject" FSM 504 to be embedded. Each constituent becomes a generalized transition between these embedded relationship FSM's. For instance, the passive verb group headed by "named" becomes a transition 152 between the "subject" FSM's 504 output state and the "object" FSM's 406 input state.

Constituents in the relationship path are generalized to create transitions using the following simple bias. Noun-group constituents whose heads are entities (e.g., names, companies, titles) are generalized into transitions that test for constituents headed by any entity of the same type. For instance, the constituent "Bob" becomes a transition 150 testing for any noun group headed by words that form a [name]. All other constituents become transitions that test for their constituent type and head word(s). For instance, the verb group "was named" becomes a transition 152 testing for a passive verb group with the head word "named". This is a small generalization: the transition will match variations like "has been named", "was also named", etc., in addition to the original "was named".

Finally, the path of transitions derived from the example is merged into the extraction FSM. This merging step is what adds the new extraction pattern, represented by the path of transitions, to the system's pattern dictionary, represented by the extraction FSM. LIEP merges the new path of transitions into the extraction FSM in order starting from the front of the path. The initial transition leaves the extraction FSM's initial state ("s1" (148) in FIG. 10). For each transition along the new path, LIEP checks whether a transition between the same states already exists in the extraction FSM. If so, it moves to the next transition. If not, LIEP looks for an already-existing similar transition that can be generalized to cover the new transition being merged into the machine. Finally, if no similar transition exists, the new transition is created within the extraction FSM.

LIEP will generalize an existing transition to cover a new transition being merged if both transitions connect the same states and test the same type of constituent, but they test different head words. This occurs when a training example involves the same syntactic relationships as earlier examples, but uses different vocabulary. To generalize the existing transition, LIEP inserts a disjunctive test that matches both the head word(s) already tested, plus the head word in the new transition.

Figure 11:
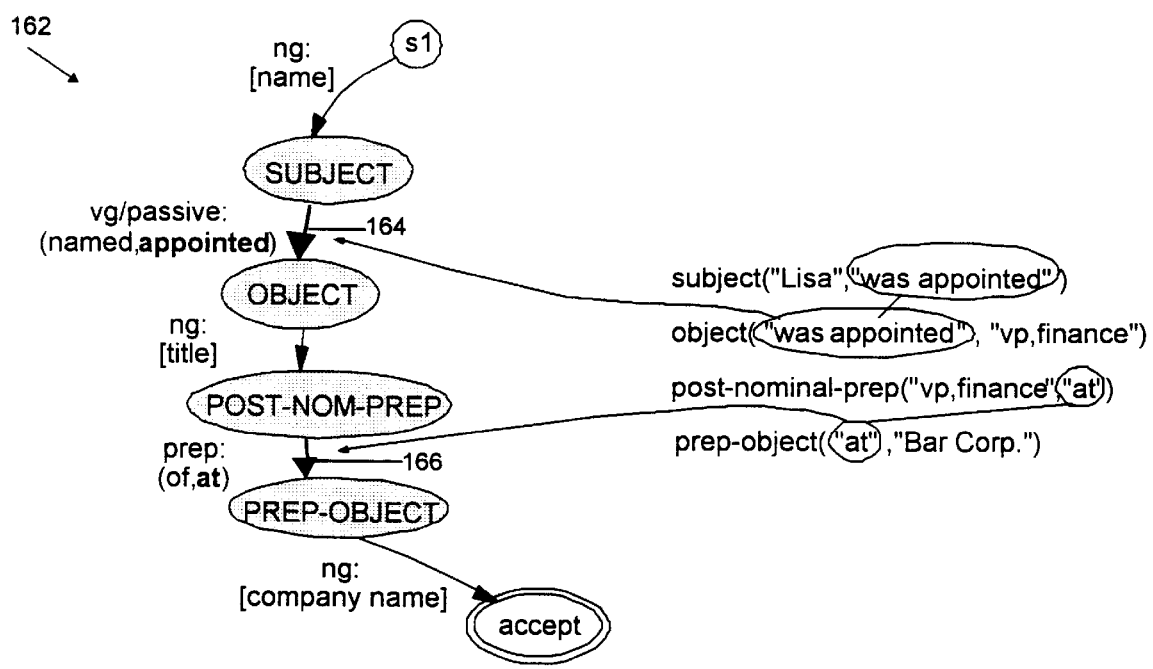
FIG. 11 is a further diagram illustrating a process used by the learning system for generalizing a finite state machine path based on an input example according to the invention.

For instance, imagine that after example (1), LIEP is trained on "In other news, Lisa has been appointed vp, finance, at Bar Corp" (Example 2). The role-fillers in (2) are related by a path of syntactic relationships similar to those in (1), but the specific words are different. In particular, where (1) uses "named" in a passive verb group, (2) uses "appointed" and where (1) uses "of", (2) uses "at". FIG. 11 shows the resulting extraction FSM path 162 after processing (2). No new transitions have been added to the FSM, but those testing "named" (164) and "of" (166) have been generalized.

Later examples can cause further generalization by adding more possibilities to the disjunctive sets of head words tested by transitions. In addition, for open-class words (nouns and verbs), the LIEP system re-uses these sets of head words when creating or generalizing transitions during the processing of future examples. For instance, if a word set containing "named", "appointed", and "elected" has been learned by generalizing some transition, when other transitions containing "named" are generalized, "appointed" and "elected" will also be included. LIEP's overall technique for creating a FSM transition test from a constituent is shown in pseudocode form as the routine "Generalize_constituent_ . . . ", below. Notice that for closed-class constituents like prepositions, LIEP uses a separate word set for each transition (as opposed to re-using word sets in future examples), because those items are typically used in a more context-specific way.

```
generalize_constituent_into_FSM_Transition_Test (C) {
    if C is a noun-group containing an entity (e.g. a company's
        name, a person's name, etc.)
    then {Test = test for a noun-group containing an entity of the
        same type as the one in C}
    else
    if C is a noun-group or verb-group, and the head word of C
        appears in a disjunctive list of head-words elsewhere in
        LIEP's extraction pattern FSM,
    then {Test = test for a constituent with the same syntactic
        category as C, and the disjunctive list as the
        constituent's possible head-words}
    else
    {Test = test for a constituent with the same syntactic
        category and head word as C.}
    return Test;
}
```

Now that the LIEP system's overall processing of training examples has been described, we will describe in greater detail the method used for inducing new local syntactic relationships. As mentioned above, new local relationships are induced by the LIEP system in cases where the currently known relationships (ODIE's original set of relationships plus any new relationships learned from previous training examples) is not sufficient to create a relationship path between a pair of constituents that occur in a training example. Repeating the example given above, "Foo Inc. named Bob Smith CEO, and Jane Jones president" (Example 1b).

ODIE's initial set of relationships cannot be used to relate "Foo Inc." to "Jane Jones" because none of the relationships can relate a verb group (like "named") to a noun group constituent (like "Jane Jones") that is separated from it by other noun groups (like "Bob Smith" and "CEO") and a conjunction ("and"). Thus, using only ODIE's initial set of relationships, the LIEP system would not be able to create a pattern from the example:

"company(Foo Inc.), person(Jane), title(president)".

The method of the present invention for learning a new local syntactic relationship that relates a pair of unrelatable constituents in an input training example is to first, find the smallest unrelatable gap between the constituents. This is done using the algorithm below, where C1 and C2 are the pair of unrelatable constituents from the training example:

```
find_smallest_unrelatable_gap_between_constituents(C1,C2) {
    MaxForwardFromC1 = the constituent before C2;
    while (MaxForwardFromC1 != C1) {
        if find_relationships(C1, MaxForwardFromC1) succeeds
            then Goto A
        else MaxForwardFromC1 = the constituent before
            MaxForwardFromC1;
    }
A:
    MaxBackFromC2 = the constituent after MaxForwardFromC1;
    while (MaxBackFromC2 != C2) {
        if find_relationships(MaxForwardFromC1, MaxBackFromC2)
            succeeds then Goto B
        else MaxBackFromC2 = the constituent after
            MaxBackFromC2;
    }
B:
    return [MaxForwardFromC1,MaxBackFromC2];
}
```

The first part of this algorithm tries to find the furthest point forward in the sentence from C1, up to C2, that can be related to C1 using the known set of local relationships. Thus, it starts by setting "MaxForwardFromC1" to be the constituent just before C2, and tries to find a path of relationships from C1 to that point. If no such path is found, the algorithm moves "MaxForwardFromC1" back one constituent (thus moving closer to Cl), and tries again to find a relationship path. If no relationship paths forward from C1 can be found, then MaxForwardFromC1 ends up being equal to C1.

Similarly, the second part of the algorithm tries to find the furthest point back in the sentence from C2, up to MaxForwardFromC1, that can be related to C2 using the known relationships. It starts by setting "MaxBackFromC2" to be the constituent just after "MaxForwardFromC1", and tries to find a path of relationships from "MaxBackFromC2" to C2. If no such path is found, the algorithm moves "MaxBackFromC2" forward one constituent in the sentence (thus moving closer to C2) and tries again to find a relationship path to C2. If no relationship paths back from C2 can be found, then "MaxBackFromC2" ends up being equal to C2.

Finally, the algorithm returns the constituent pair [MaxForwardFromC1,MaxBackFromC2], which represents the smallest unrelatable pair of constituents in between the pair [C1,C2] within the input training example sentence.

In example (1b) above, the LIEP system needs to find the smallest unrelatable gap in between "Foo Inc." and "Jane Jones". Thus, it calls the algorithm above, giving it "Foo Inc." as C1 and "Jane Jones" as C2. The first part of the algorithm sets MaxForwardFromC1 to "and", but can find no relationship from "Foo Inc." to "and"; next, it sets MaxForwardFromC1 to the comma after CEO, but again, finds no relationship. Finally, it sets MaxForwardFromC1 to "CEO", and finds a relationship path from "Foo Inc." to "CEO" (the path is subject(Foo Inc., named), object(named, Bob Smith), next_ng(Bob Smith, CEO)). Thus MaxForwardFromC1 remains at "CEO". Next, the second part of the algorithm begins with MaxBackFromC2 as the comma after CEO, but can find no relationship from there to "Jane Jones"; it sets MaxBackFromC2 to the "and" before "Jane Jones" but again finds no relationship, and so sets MaxBackFromC2 to "Jane Jones". Thus, the smallest unrelatable gap between "Foo Inc." and "Jane Jones" found by the algorithm is between the constituents "CEO" and "Jane Jones".

Next, the method of the present invention builds a new local syntactic relationship based on the smallest unrelatable pair of constituents that has just been found within the input training example sentence. The new relationship, which will take the form of an embeddable FSM, is built using the algorithm build_new_local_relationship shown below. Given constituents Cons1 and Cons2 that are the endpoints of an unrelatable gap in an input example sentence, the algorithm creates a new FSM (called newFSM in the algorithm) that encodes a new local relationship between Cons1 and Cons2. The incoming transition test to newFSM is created from Cons1, and its outgoing test is created from Cons2, using the routine create_in_or_out_transition_test below. The other transitions within newFSM are created based on finding a relationship path between Cons1 and Cons2 that can include the minimal relationship "next(A,B)". Next(A,B) is a minimal relationship that holds between any two adjacent constituents A and B; adding it to the relationship set ensures that some relationship path between Cons1 and Cons2 will be found (at worst, the path will be [next(Cons1,X),next(X,Y), . . . next(Z, Cons2)]).

Figure 12:
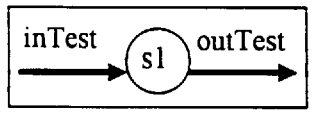
FIG. 12 is a diagram of a first finite state machine illustrating a result of a specific algorithm.
Figure 13:
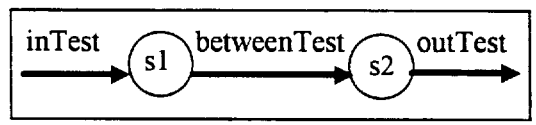
FIG. 13 is a diagram of a second finite state machine illustrating a result of a specific algorithm.
Figure 14:
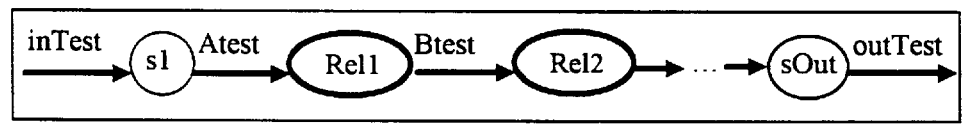
FIG. 14 is a diagram of a third finite state machine illustrating a result of a specific algorithm.

```
create_in_or_out_transition_test(C) {
    if C is a noun-group containing an entity (e.g. a company's name,
        a person's name, etc.)
    then {test = test for a noun-group containing an entity of the same type
        as the one in C}
    else {test = test for a constituent with the same syntactic category as C,
        and any head word.}
    return test;
}
build_new_local_relationship(Cons1,Cons2) {
    inTest = create_in_or_out_transition_test(Cons1)
    outTest = create_in_or_out_transition_test(Cons2)

if Cons1 and Cons2 are adjacent in the sentence then {
        newFSM = the machine depicted in Fig. 12.}
    else if Cons1 and Cons2 have only one constituent ConsBetween
        between them, then {
        betweenTest = generalize_constituent_into_FSM_transition_test
            (ConsBetween)
        newFSM = the machine depicted in Fig. 13.}
    else if Cons1 and Cons2 have multiple constituents between them then {
        PostCons1 = the constituent after Cons1
        PreCons2 = the constituent before Cons2
        Add "next(X,Y)" to the set of local syntactic relationships used by
            find_relationships, where "next(X,Y)" holds for any adjacent
            constituents X and Y.
        Rels = find_relationships(PostCons1,PreCons2).
        Rels is of the form [Rel1(A,B), Rel2(B,C), Rel3(C,D), ...]. For each
            constituent in Rels (e.g. A,B,C,D,...), create a FSM test by
            calling generalize_constituent_into_FSM_transition_test; e.g.:
            Atest = generalize_constituent_into_FSM_transition_test(A)
            Btest = generalize_constituent_into_FSM_transition_test(B)
        etc.
        newFSM = the machine depicted in Fig. 14.} return newFSM.
}
```

Figure 15:
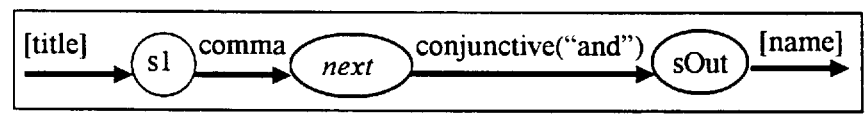
FIG. 15 is a diagram of a fourth finite state machine illustrating a result of a specific algorithm.

For example (1b), build_new_local_relationship is called with "CEO" and "Jane Jones" (the endpoints of the smallest unrelatable gap in the example sentence). Create_in_or_out_transition_test ("CEO") returns a transition test for a noun-group headed by a [title], for inTest; create_in_or_out_transition_test("Jane Jones") returns a transition test for a noun-group headed by a [name], for outTest. Since there are multiple constituents between "CEO" and "Jane Jones" (two of them—a comma and "and"), we fall to the last condition in build_new_local_relationship. PostCons1 is the comma, PreCons2 is "and", and the relationship path found between them is simply [next(comma,"and")]. Thus, the resulting new relationship FSM is newrel1, shown in FIG. 15.

This new relationship FSM is added to ODIE's dictionary of local relationships, and is used to complete the processing of example (1b) to produce a full extraction pattern from it. NewRel1 is also available to be used in analyzing future training examples. By learning new relationships, LIEP is essentially extending its vocabulary for analyzing examples.

NewRel1 is not a "general" syntactic relationship the would be useful in any domain. The LIEP system is not an attempt to learn syntax for general natural language. Rather, newRell is a specific, local relationship that is useful in relating parallel-structure examples like (1b) in a specific information extraction domain (for (1b), the management changes domain). The LIEP system learns different local relationships in different extraction domains—just those local relationships that are needed to learn extraction patterns from the input training examples the system is given.

To test the LIEP system's performance, a corpus of 300 naturally-occurring texts reporting management changes was collected. The corpus was drawn from newswire articles appearing in the Wall Street Journal, New York Times, Business Wire, PR Newswire, and other newswire services, in January and early February 1995. Each corpus text contained either one or two sentences from a newswire article. Many of the corpus sentences were complex, and contained multiple names and companies. Often, more than one management change was reported in a single sentence, either through multiple complete clauses or parallel structure.

The LIEP system was executed multiple times over randomly-chosen training sets of different sizes. For each run, the LIEP system was trained using some number of randomly selected training texts (averaged over five runs) from the 300-text corpus, and then its performance was tested on a disjoint set of 100 randomly selected test texts from the corpus. The ODIE system's average F-measure using a hand-built set of patterns on randomly selected sets of 100 test texts from the corpus is 89.4% (recall 85.9% precision 93.2% averaged over ten runs). After 200 training texts, the LIEP system reached an average F-measure of 87.2% (recall 83.3%; precision 91.5%)—a difference of less than three percent from the hand-built patterns.

As the number of training examples is increased, the number of new patterns the LIEP system must learn begins to level off as expected as more of the learning involves generalizing previously learned patterns.

The invention has now been explained with reference to specific embodiments. Other embodiments will be apparent to those of ordinary skill in the art. It is therefore not intended that the invention be limited, except as indicated by the appended claims.

What is claimed is:

1. In a computerized example-based pattern learning element of an information-extraction system, said element having as input, texts containing user-identified events and as output, information-extraction patterns that can be used to extract similar events from similar texts, a method for learning local syntactic relationships to be used as components within information-extraction patterns learned by said pattern learning element, said method comprising the steps of:

analyzing an example text and event given to the learning element to establish that the learning element contains an incomplete current dictionary of local syntactic relationships needed to form paths of relationships between all constituents of the text that participate in the event, thus making the learning element unable to form a new extraction pattern from said example text and event;

thereupon finding the closest pair of constituents within the example text that cannot be related by local syntactic relationships in the current dictionary;

inferring a new local syntactic relationship between said closest pair, said new local syntactic relationship being expressed as a finite state machine;

adding said finite state machine to said dictionary so that said finite state machine can be embedded in patterns produced by said learning element; and re-invoking the learning element on said example text and said example event to learn an information extraction pattern from said example text and said example event by making use of the newly-inferred local syntactic relationship finite state machine.

2. In the computer-based system according to claim 1 wherein said finding step produces a closest pair of constituents C1 and C2, and wherein said inferring step comprises:

creating an inbound transition, said inbound transition testing for constituent properties equal to a syntactic category of said C1;

creating an outbound transition, said outbound transition testing for constituent properties equal to the syntactic category of said C2; and inferring a series of states and intermediate transitions, said series being between said inbound transition and outbound transition, wherein said intermediate transitions in said series testing constituent properties based on the syntactic categories, and one of entity types and of head words, said properties being of the series of constituents appearing in the example text between constituents C1 and C2.

3. The method according to claim 2 wherein a head entity type for C1 exists, said inbound creating step further including in said inbound transition a test for said head entity type.

4. The method according to claim 2 wherein a head entity type for C2 exists, said outbound creating step further including in said outbound transition a test for said head entity type.

* * * * *